US009880726B2

(12) United States Patent
Briand

(10) Patent No.: US 9,880,726 B2
(45) Date of Patent: Jan. 30, 2018

(54) FRAGMENTED SCROLLING OF A PAGE

(71) Applicant: ORANGE, Paris (FR)

(72) Inventor: Hyacinthe Briand, San Francisco, CA (US)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/134,672

(22) Filed: Dec. 19, 2013

(65) Prior Publication Data

US 2014/0181730 A1    Jun. 26, 2014

Related U.S. Application Data

(60) Provisional application No. 61/745,291, filed on Dec. 21, 2012.

(51) Int. Cl.
*G06F 3/0485* (2013.01)
*G06F 3/0488* (2013.01)

(52) U.S. Cl.
CPC ........ *G06F 3/0485* (2013.01); *G06F 3/04883* (2013.01)

(58) Field of Classification Search
CPC ........................... G06F 3/0485; G06F 3/04855
USPC .................................................. 715/784, 830
See application file for complete search history.

(56) References Cited

U.S. PATENT DOCUMENTS

| 5,398,310 | A | * | 3/1995 | Tchao et al. | 715/234 |
| 5,563,996 | A | * | 10/1996 | Tchao | G06F 3/04883 715/201 |
| 2002/0186251 | A1 | | 12/2002 | Himmel et al. | |
| 2006/0271870 | A1 | * | 11/2006 | Anwar | G06F 3/0481 715/764 |
| 2006/0282858 | A1 | * | 12/2006 | Csicsatka | G06F 3/0485 725/52 |
| 2008/0165210 | A1 | * | 7/2008 | Platzer | G06F 3/0485 345/672 |
| 2010/0013651 | A1 | * | 1/2010 | Spalink | 340/669 |
| 2011/0148934 | A1 | | 6/2011 | Nurmi | |
| 2011/0252362 | A1 | * | 10/2011 | Cho et al. | 715/784 |

(Continued)

FOREIGN PATENT DOCUMENTS

EP    2302493 A2    3/2011
WO    2011100623 A2    8/2011

OTHER PUBLICATIONS

Prosecution history of corresponding European Patent Application No. 13306730.6 including: Communication dated Mar. 3, 2015 and European Search Report dated Feb. 18, 2015.

(Continued)

*Primary Examiner* — Christopher Kohlman
(74) *Attorney, Agent, or Firm* — David D. Brush; Westerman Champlin & Koehler, P.A.

(57) ABSTRACT

A method is provided for displaying an electronic document having a first portion visible on a graphical user interface (GUI) rendered on a touch panel of an electronic device, and a second hidden portion accessible through a scrolling input received on said touch panel. The method includes receiving a scrolling input on the touch panel from a user to access the second hidden portion, retrieving from the second hidden portion of the electronic document a subportion smaller than the touch panel in the scrolling direction, based on the received scrolling input, and scrolling the electronic document to display the subportion in response to the scrolling input.

11 Claims, 6 Drawing Sheets

(56) References Cited

U.S. PATENT DOCUMENTS

2012/0062604 A1* 3/2012 Lobo et al. .................. 345/684
2012/0110442 A1    5/2012 Sharkey
2012/0174005 A1    7/2012 Deutsch et al.
2012/0218203 A1* 8/2012 Kanki .......................... 345/173

OTHER PUBLICATIONS iOS Dev Notes, "How to: UIScrollView with Paging iOS Notes", Dec. 5, 2012, pp. 1-6, XP055166238.

* cited by examiner

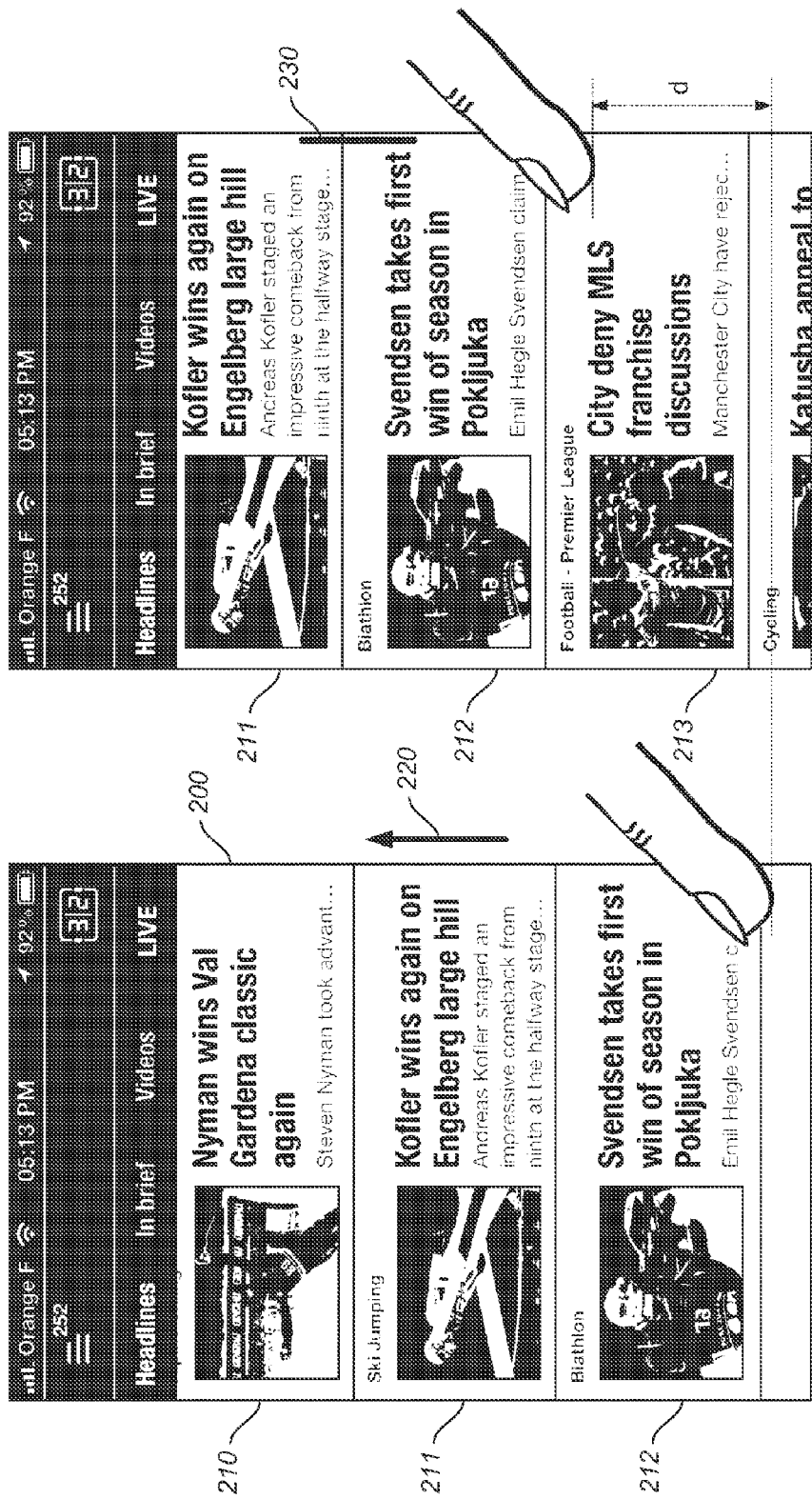

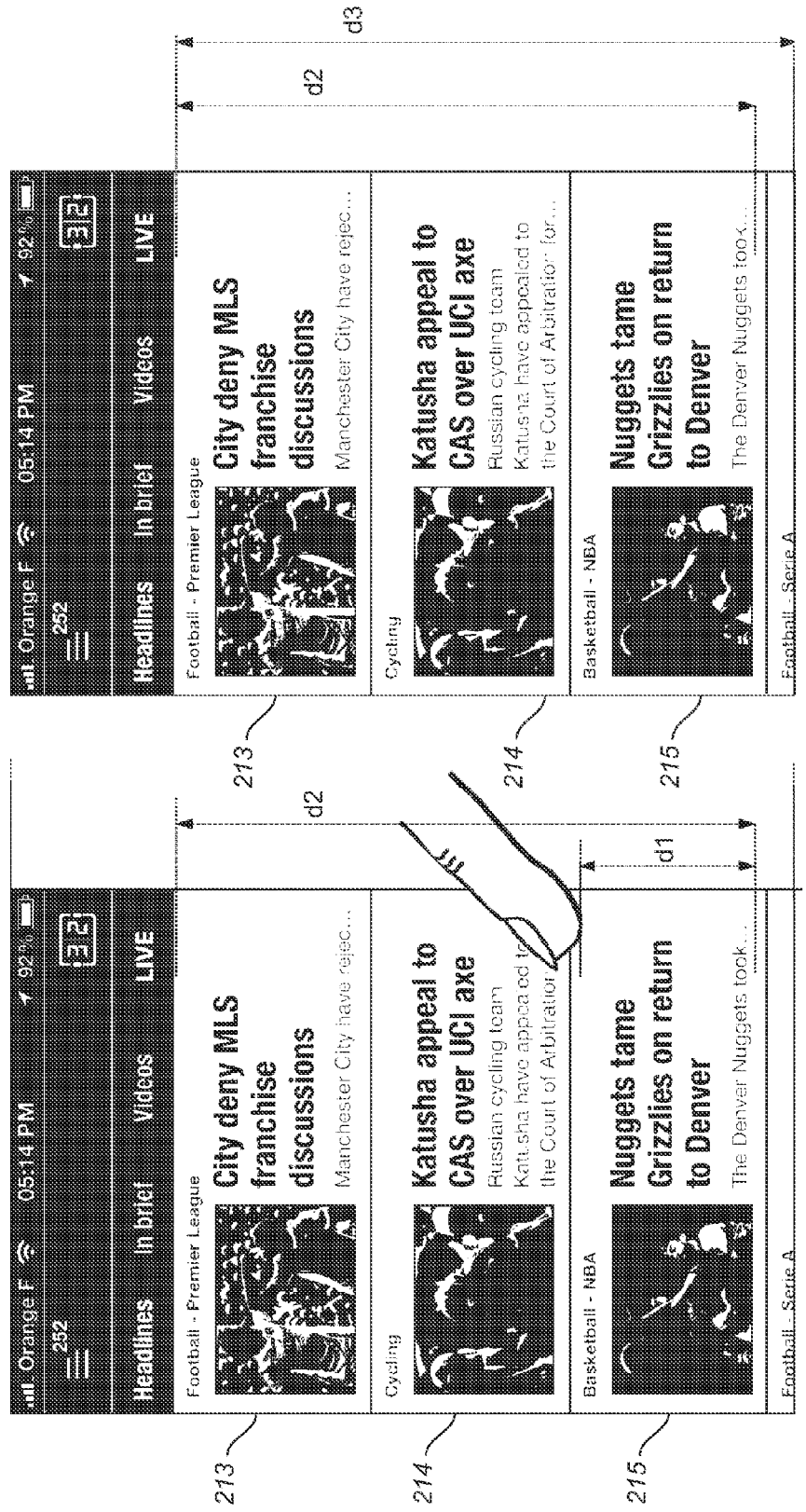

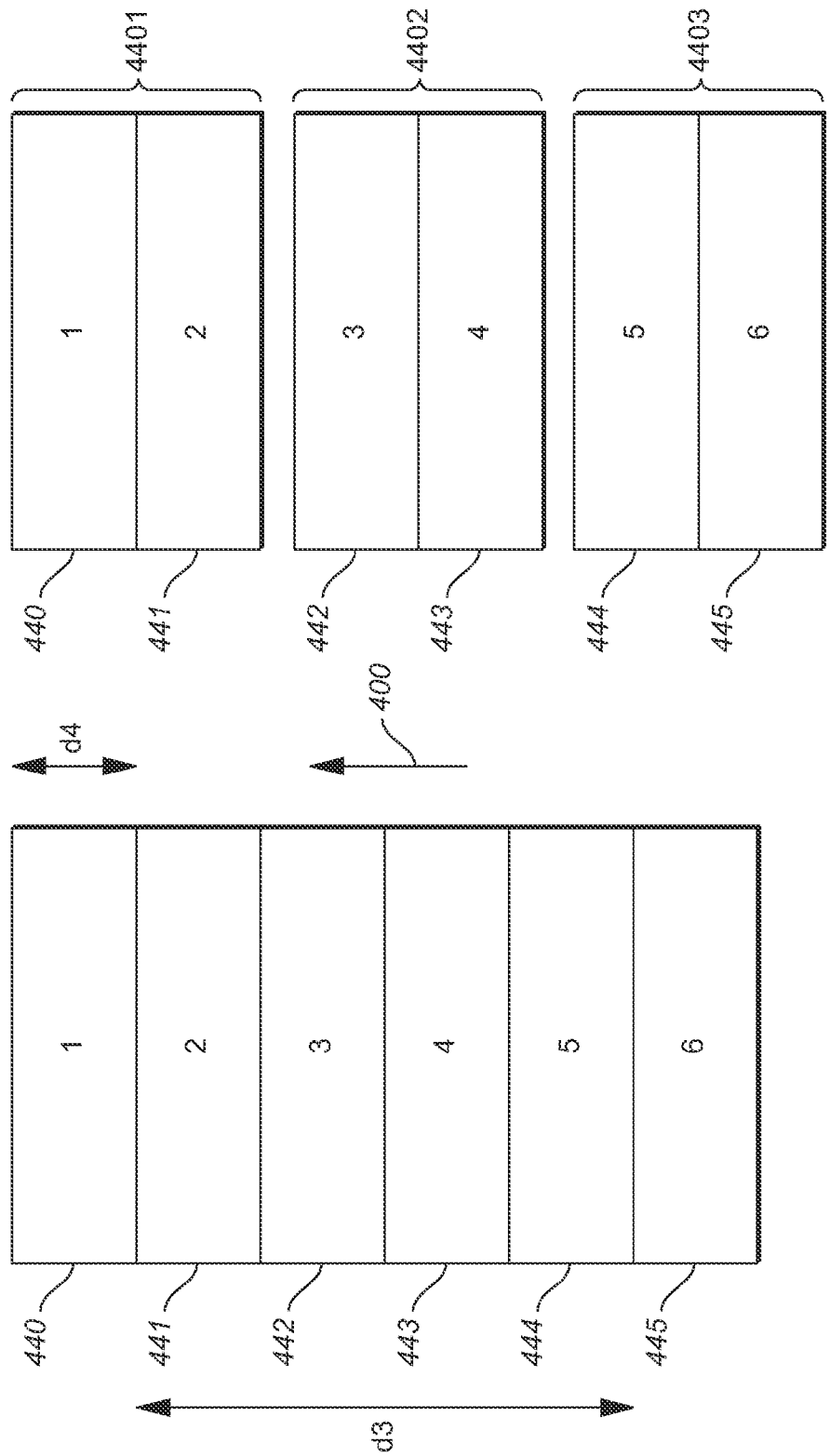

FRAGMENTED SCROLLING OF A PAGE

CROSS-REFERENCE TO RELATED APPLICATION

The present application is based on and claims the benefit of U.S. Provisional Patent Application Ser. No. 61/745,291, filed Dec. 21, 2012, the content of which is hereby incorporated by reference in its entirety.

FIELD OF THE PRESENT SYSTEM

The present disclosure generally relates to electronic devices, and more specifically to graphical user interfaces displayed by such devices.

BACKGROUND OF THE PRESENT SYSTEM

Mobile handsets have an inherently impoverished graphical user interface (GUI) with respect to desktop computers. Small screens and tiny keyboards are typical of mobile handsets that fit in your pocket. Recent so called smart phones have introduced the use of a touch screen in an attempt to simplify the user experience with his mobile handset. For instance, the touch interface of the iPhone® has revolutionized the mobile handset industry and brought whole new mobile user experiences.

In existing smart phones, application programs (AP) may be controlled using touch inputs. Different touch inputs may control the AP in different ways. For instance, a user touching an AP icon will cause a control of the desktop GUI that will launch the AP corresponding to the touched icon. Scrolling is one of the many controls offered to a user. FIGS. 2A-2B are illustrations of known scrolling on a GUI of a mobile device. A GUI 200 of a mobile application is illustrated in FIG. 2A. The GUI renders a first visible portion of an electronic document, comprising three snippets of news, namely 210, 211, and 212. The electronic document is scrollable in the vertical direction 220, to reveal a second hidden portion. Indeed, thanks to a user input in the direction 220 (illustrated in FIG. 2A with a finger moving a distance d), the second hidden portail can be displayed as shown in FIG. 2B. The snippets 210 disappears while the snippets 211 and 212 move the same distance d along the direction 220, revealing a fourth nippet 213, which was part so far of the hidden second portion. A scrolling indication 230 may be rendered while the user performs the scrolling input to give the user a visual feedback of his progress in the whole electronic document.

Existing smartphone interfaces, for instance social application GUIs, use today heavily the scrolling operation to show endless activity feeds in a quick way. This distracts the user from the content. Alternative solutions have been proposed to easy the rendering of information to the user. Such solutions may be found in applications like Flipboard™ which proposes a preprocessing of an electronic document to reformat it so that it can be rendered in a book the pages of which the user can flip.

Today there is still a need to an improved scrolling operation performed on an electronic document. There is a further need for a simplified simplified scrolling that does not distract the user from the content of the electronic document being scrolled.

SUMMARY OF THE PRESENT SYSTEM

The present system relates to a method for displaying an electronic document comprising a first portion visible on a graphical user interface (GUI) rendered on a touch panel of an electronic device, and a second hidden portion accessible through a scrolling input received on said touch panel, the method comprising:
receiving a scrolling input on the touch panel from a user to access the second hidden portion,
retrieving from the second hidden portion of the electronic document a subportion smaller than the touch panel in the scrolling direction, based on the received scrolling input,
scrolling the electronic document to display the subportion in response to the scrolling input.

Thanks to the present method, the user can enjoy a fragmented scrolling. By fragmented scrolling, one may understand a scrolling that progresses subportions by subportions, and not directly linked to the user scrolling input as in known scrolling techniques. This allows a better focus on the electronic document. This is particularly suitable to electronic documents that are normally accessible through continuous scrolling, i.e. where each time the user provides a scrolling input, he gets access to other sections of the document. Here the user will get access to hidden portions, but only through subportions of predefined size. The rendering becomes semi-continuous.

The present system also relates to an electronic device electronic for displaying an electronic document comprising a first portion visible on a graphical user interface (GUI) rendered on a touch panel of the electronic device, and a second hidden portion accessible through a scrolling input received on the touch panel, the electronic device comprising a control circuit arranged to:
receive a scrolling input on the touch panel from a user to access the second hidden portion,
retrieve from the second hidden portion of the electronic document a subportion smaller than the touch panel in the scrolling direction, based on the received scrolling input,
scroll the electronic document to display the subportion in response to the scrolling input.

The present system also relates to an application embodied on a non transitory computer readable storage medium and executable by an electronic device in the form of a software agent including at least one software module comprising instructions to:
receive a scrolling input on the touch panel from a user to access the second hidden portion,
retrieve from the second hidden portion of the electronic document a subportion smaller than the touch panel in the scrolling direction, based on the received scrolling input,
scroll the electronic document to display the subportion in response to the scrolling input.

BRIEF DESCRIPTION OF THE DRAWINGS

Embodiment of the present disclosure are explained in further detail, and by way of example, with reference to the accompanying drawings wherein:
FIGS. 2A, 2B show known GUIs of an electronic document;
FIGS. 2C-2F show GUIs according to an embodiment of the present system;
FIG. 4A shows a known GUI of an electronic device, and;

FIG. 4B shows a GUI according to an exemplary embodiment of the present method.

DETAILED DESCRIPTION OF THE PRESENT SYSTEM

Figure 1:
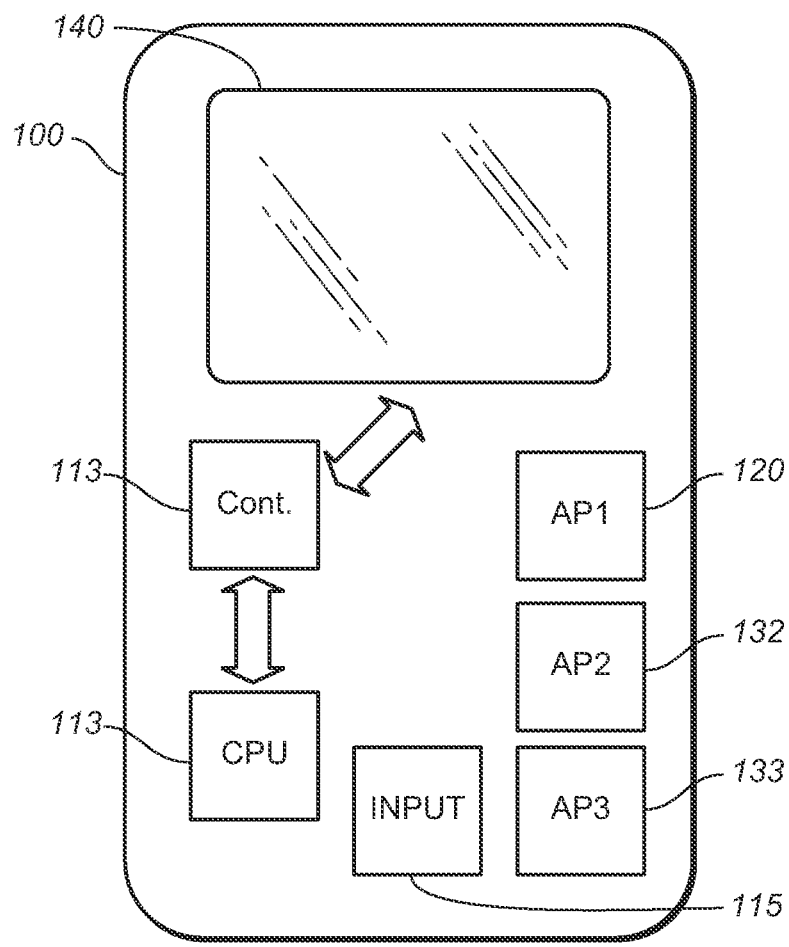
FIG. 1 shows a mobile device in accordance with an embodiment of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. An operative coupling may also include a wired and/or wireless coupling to enable communication between a media content platform and one or more user devices in accordance with an embodiment of the present system. An operative coupling may also relate to an interaction between program portions and thereby may not describe a physical connection so much as an interaction based coupling.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface on a display device so that it may be seen and interacted with by a user. The term rendering may also comprise all the actions required to generate a GUI prior to the display, like e.g. a map representation generated on a server side for a browser application on a user device.

The system, device(s), method, user interface, etc., described herein address problems in prior art systems. The man skilled in the art may easily apply the present teachings to any electronic device presenting a touch sensitive panel, (referred also hereafter as a touch sensitive display or screen), a pointing device (like a mouse) or a keyboard.

In accordance with an embodiment of the present system, an electronic device provides a GUI for controlling an application program (AP) through user inputs, such e.g. as touch or mouse inputs. In the description hereafter, reference will be made to a mobile device or handsets. This is in no way a limitation of the present method as the teaching herein may be applied to any electronic device presenting a touch interface.

A graphical user interface (GUI) may be provided in accordance with an embodiment of the present system:

- by an application program running locally on a device processor, such as part of a computer system of a mobile device, and/or,
- as provided by a network connected device or web based server, such as a content server providing content to the user device, the GUI being rendered on user device through a local application program (e.g. a browser or web application) connected to media content server.

For instance, the present GUI enabling the fragmented scrolling may be generated by processing locally an electronic document and fragment it into subportions smaller than the GUI size in the scrolling direction. Alternatively, the present GUI may be the rendering by a local AP of a preprocessed electronic document comprising already markers to the subportions smaller than the GUI size in the scrolling direction. The provided visual environment may be displayed by the processor on a display device of the user device, e.g. a touch sensitive panel (touch panel in short), which a user may use to provide a number of touch inputs of different types.

A GUI is a type of user interface which allows a user to interact with electronic devices such as computers, handheld devices such as smartphones or tablets, household appliances, office equipment and the likes. GUIs are typically used to render visual and textual images which describe various visual metaphors of an operating system, an application, etc., and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars, maps, etc. Such images can be arranged in predefined layouts, or can be created dynamically (by the device itself or by a web-based server) to serve the specific actions being taken by a user. In general, the user can select and/or activate various graphical images in order to initiate functions and tasks, i.e. controls, associated therewith. By way of example, a user can select a button that opens, closes, minimizes, or maximizes a window, a virtual representation or an icon that launches a particular application program. By way of another example, the GUI may present a typical user interface including a windowing environment and as such, may include menu items, pull-down menu items, icons, pop-up windows, etc., that are typical of those provided in a windowing environment, such as may be represented within a Windows™ Operating System GUI as provided by Microsoft Corporation and/or an OS X™ Operating System GUI, such as provided on an iPhone™, MacBook™, iMac™, etc., as provided by Apple, Inc., and/or another operating system (OS).

In the description here after, an application program (AP)—or software—may be seen as any tool that functions and is operated by means of a computer, with the purpose of performing one or more functions or tasks for a user or another application program. To interact with and control an AP, a GUI of the AP may be displayed on the user device display.

FIG. 1 is an illustration of an exemplary user device 100 used in the present system. In the here after description, the user or electronic device will illustrated as a mobile device 100 with a touch interface. This illustration is in no way limiting as the present teaching would work for any user devices such as laptops, pads, desktops and the likes, enabling the user to interact through a touch interface, a pointing device and/or a keyboard. The mobile device 100 comprises a display device 140, a processor 110, a controller 113 of the display device, and an input device 115.

In the present system, the user interaction with and manipulation of the application program rendered on a GUI is achieved using the display device 140, or screen, which is presently a touch panel operationally coupled to the processor 112 controlling the displayed interface.

Processor 110 may control the rendering and/or the display of the GUI on the display device 140 depending on the type of application program, i.e. resident or web-based. Processor 110 may also handle the user entries according to the present method. The user entries to interact with an application program may be provided through interactions with the touch panel 140.

The touch panel 140 can be seen as an input device allowing interactions with a finger of a user or other devices such as a stylus. Touch sensor interface or touch panel 140 may include any suitable circuitry to convert analog signals corresponding to touch input received over its surface into any suitable digital touch input data. Such touch input data can, for example, be used to make selections of portions of the GUI of an AP or scroll an electronic document rendered on the display device 140 as explained here after. The input received from a user's touch is sent to the processor 110. The touch panel 140 is configured to detect and report the (location of the) touches to the processor 110, which can interpret the touches in accordance with the application program and the currently displayed GUI. For example, the processor 110 can initiate a task, e.g. a control of the AP to seek a subportion of an hidden portion of an electronic document subsequent to a scrolling input received on the touch panel 140.

The controller 113, e.g. a dedicated processor, may be provided to process input touches locally and reduce demand for the main processor 110 of the mobile device. The touch panel 140 can be based on sensing technologies including but not limited to capacitive sensing, resistive sensing, surface acoustic wave sensing, pressure sensing, optical sensing, and/or the likes. Here after, for simplification purpose, reference will be made to a finger of the user touching panel 140, other devices such as a stylus may be used in place of the user finger.

In the present system, a number of different applications may be provided with the mobile device 100, like AP1 131, AP2 132 and AP3 133. Such APs may be for instance web applications like news or sports applications, rendering GUIs like the ones seen in FIGS. 2A-2F. Such interfaces will correspond to an electronic document comprising a first portion visible through the GUI, and a second hidden portion, accessible through a scrolling input from a user of the mobile device 100.

In computer displays, scrolling may be seen as the action of sliding an electronic document, like a webpage, a text document, images or videos across a monitor or display, vertically or horizontally, called the scrolling direction. Scrolling, as such, does not change the layout of the document, but moves (pans or tilts) the user's view across what is apparently another portion of the document (than the one rendered on display to the user) that is not wholly seen at first. to Scrolling may be triggered on a touchscreen through a continuous touch input—the scrolling input—in the scrolling direction. The document will move proportionally or not, with some momentum or not . . . to the scrolling input. For instance the scrolling may carry one even after the user has released his finger from the touch panel. Alternatively, the scrolling may end with that release. In some configurations of mobile devices, the scrolling may be a combination of both, depending on the speed of the continuous touch input. Generally, it is only the component (called here after the scrolling input length) in the scrolling direction of the scrolling input, along optionally with the speed to cover that length, which is retained by the electronic device to move the electronic document.

In the present method, the scrolling is referred to as a fragmented scrolling. This means that the scrolling is not a continuous scrolling where more portions from the electronic document becomes visible as the user scrolls through the document. It is neither a book like presentation where the electronic document is formatted into pages that are displayed one after the others as the user requests access to other pages. The document will still be scrolled, but only a predefined subportion will be displayed in response to the scrolling input. This is particularly suitable to electronic documents that are normally accessible through continuous scrolling, i.e. where each time the user provides a scrolling input, he gets access to other sections of the document. Here the user will get access to hidden portions, but only through subportions of predefined size. The rendering becomes semi-continuous.

Figures 2C, 2D:
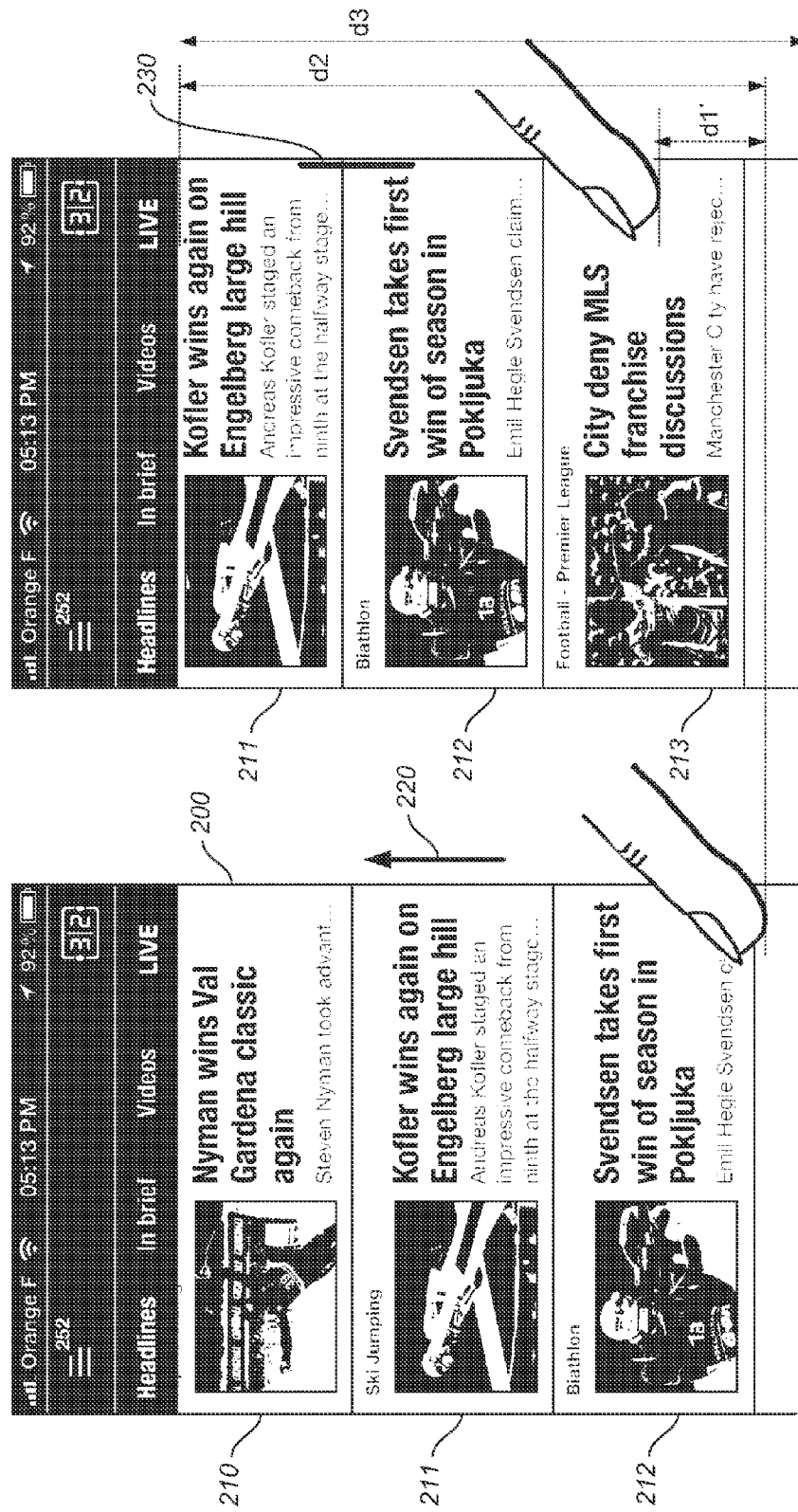
Figure 3:
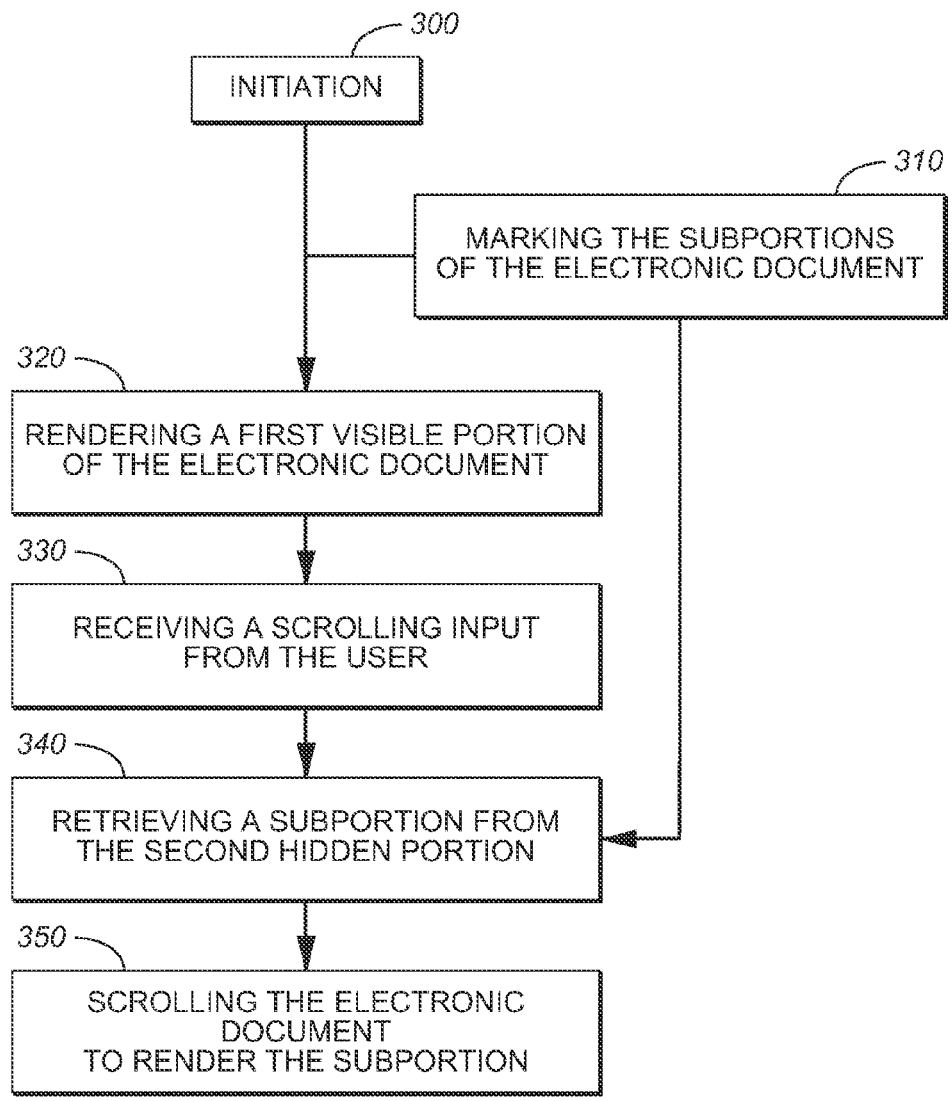
FIG. 3, shows an exemplary flowchart in accordance with an embodiment of the present system.

FIG. 3 is a flowchart illustrating an exemplary embodiment of the present method. Flowchart of FIG. 3 will be described in relation with exemplary illustrations of FIGS. 2C to 2F. The present fragmented scrolling is implemented on the mobile device through its processor 113 seen in FIG. 1.

In an initiation act 300, the user may display an electronic document through a GUI rendering on the touch panel 140 of the electronic device 100. The electronic document may be a document comprising a first visible portion, displayed through a GUI rendered on the touch panel/display device 140, and further portions hidden to the user due to the length of the document in the scrolling direction, larger than the display size.

In a further act 310, optionally after the rendering of act 300, the electronic document may be parsed to define the subportions enabling the present fragmented scrolling. The marking of the subportions may be carried out after the rending of the electronic document or prior to its rendering. In an additional embodiment of the present method, the subportion size in the scrolling direction may be predefined, for instance to a size d2 smaller than the touch panel/display size in the scrolling direction. The subportion may be even smaller than a predefined maximum scrolling input length d3, for instance when the GUI is partially used with a remanent graphical element like the menu element of FIG. 2. The marking will take into account the first portion of the electronic document which is visible on the initial GUI, and starts beyond that initial first portion.

The subportions may be of equal sizes. Alternatively, the subportion size may be adjusted to take into account constrains in the electronic document, like images, videos or graphical elements that would be partially rendering otherwise.

The electronic document, when rendered on a GUI, may be made of contiguous parts of equal or various lengths in the scrolling direction. These parts may be for instance snippets of information the format of which (and consequently the length of which) varies depending on the content they render. This is for instance the case with web applications like social network applications, or feed applications where all new postings are presented in the electronic document as another part added next to the previous ones. In an additional embodiment of the present method, the subportion may comprise one or more of these parts, e.g. as many parts as possible, provided their total length in the scrolling direction is smaller than d3, or the touch panel length if no remanent graphical element is used.

The parsing of the document will help in determining the subportions by marking them ahead of their rendering, so that the processor 113 of the mobile device 100 can recognize after capturing a scrolling input what is the next hidden subportion to render.

In a further act 320, the processor will render a first visible portion of the electronic document. This may be seen in the illustration of FIG. 2C, wherein the first visible portion of an electronic document comprising three snippets of news, namely 210, 211, and 212, and a menu element at the top of the GUI. The electronic document is scrollable in the vertical direction 220 (with the exception of the menu element that remains on screen), to reveal a second hidden portion.

In a further act 330, the touch panel 140 will receive a scrolling touch input from the user to access the second hidden portion. This touch input is illustrated in FIGS. 2C-2E through the user's finger moving a distance d1 or d1' in the scrolling direction 220.

In a further act 340, the processor 113 will retrieve a subportion from the second hidden portion based on the received scrolling input. The subportion is smaller than the touch panel size in the scrolling direction. The subportion may be contiguous to the first visible portion in the hidden second portion of the electronic document. The subportion may be even smaller than a predefined maximum scrolling input length d3, for instance when the GUI is partially used with a remanent graphical element like the menu element of FIG. 2. In the illustrations of FIG. 2E or 2F, the subportion size is d2, smaller than d3, the predefined maximum scrolling input length which corresponds in these illustrations to the size of the available GUI in the scrolling direction. In this exemplary embodiment, d3 corresponds to the touch panel size minus the size of the menu element in the scrolling direction. The processor will retrieve the next available subportion to display, based on the preliminary marking mentioned here above.

Alternatively, the act 310 described earlier may be carried out at this stage, to retrieve the subportion based on the scrolling input, as shown in FIG. 3, wherein act 310 may be carried as part of act 340. In this alternative embodiment, the subportion retrieval is done "on the fly", i.e. at the moment the scrolling input is identified. In an additional embodiment of the present method, the subportion size d2 may be dynamically linked to the scrolling input length d1. In this embodiment, as the subportion size is defined on the fly, the processor 113 will wait for the touch input to be released to determine the subportion size d2. In other words, the electronic document will be first scrolled in response to the scrolling input, with a subportion size still undefined. When the user releases his finger, ending the scrolling input, the processor will capture a value for the scrolling input length d1. It will then calculate d2 as a function of d1, for instance proportion to d1 with a multiplication factor α greater than 1. With d2, it will retrieve the end of the subportion based on the calculated d2 and the length already scrolled. In this embodiment, the function linked d2 to d1 must take into account the portion of the electronic document already scrolled before it can calculate the subportion size d1. Typically, this will give the user the impression that the scrolling continues once the scrolling input is ended, only to end with the rendering of the whole subportion.

In an additional act of the present method, the touch input may be taken into account to pass the next subportions and access a more remote subportions. In other words, the momentum of the scrolling input may be taken into account to retrieve not the immediate and next available subportion from the hidden second portion of the electronic document, but a more remote subportion.

This is similar to known scrolling methods where the momentum of the touch input is used to scroll further after the user has discontinued his scrolling touch input.

In a further act 350, the retrieved subportion will be rendered on the touch panel in response to the scrolling input. One may note that the display comprises scrolling the document to display only the retrieved subportion. Contrary to known page displays, the present method still relies upon scrolling of the electronic document. Nevertheless, it is only subportions by subportions that a document is scrolled and displayed, allowing a better control from the user over the document display.

The sequence FIGS. 2C-2D and 2E illustrates a first exemplary embodiment of the present method. In that exemplary embodiment, the scrolling of the subportion is associated with a preset scrolling input length d1. The scrolling input length may be seen as the component in the scrolling direction of a continuous input imparted by a user to scroll the electronic document. In this embodiment, the scrolling of the subportion is associated with a first preset scrolling input length of d1.

This preset scrolling input length d1 defines the length of the scrolling input required from the user to render the subportion completely. This can be seen from FIG. 2C, the starting position, wherein the electronic document of a sport application displays a top menu graphical element and three snippets 210 (at the top of the GUI right below the menu element) to 212 (at the bottom of the GUI). The snippet part of the GUI is scrollable. A user scrolling input is provided in the scrolling direction 220. FIG. 2D shows the scrolling input of a length d1' smaller than the preset d1. In this embodiment the subportion size in the scrolling direction is d2 as seen in FIG. 2D. d2 is smaller than the predefined maximum scrolling input length d3, also seen in FIG. 2D (size of the panel minus the size of the menu element in the scrolling direction).

The processor 113, following the detection of a scrolling input, has already retrieved the subportion, here the next three snippets following snippet 212 in the scrolling direction. As can be seen in FIG. 2D, scrolling has begun with the display of new snippet 213, while the top snippet 210 has been replaced by former middle snippet 211.

As the scrolling of the subportion is associated to the first preset scrolling input length d1, it will take a scrolling input of that length to entirely display the new subportion. In the next FIG. 2E, the user scrolling input reaches the length d1 and the subportion formed of snippets 213 to 215 is displayed. In an additional embodiment of the present method, any further scrolling input beyond d1 in length may be discarded by the processor, so as to emphasize the fragmented scrolling, and give the user a visual feedback that the subportion is displayed entirely. Alternatively, the contribution of any further scrolling input beyond d1 may be dampened by the processor, to as to give that same visual feedback to the user.

More generally, the scrolling of the electronic document in act 350 will comprise altering the scrolling of the electronic device when length of the scrolling input exceeds the first preset scrolling input length d1 in the scrolling direction.

When d1 (the first preset scrolling input length) is smaller than d2, the preset length of a subportion, the processor may apply a multiplication factor d1/d2 to the scrolling input. In other words, each time the user scrolling input moves by a further x in the scrolling direction, the subportion will be scrolled on screen by a further x.d1/d2 so that a scrolling of d1, i.e. the preset scrolling length, will cause the processor to scroll the subportion entirely.

In an alternative embodiment of the present method, the processor may be configured to keep on scrolling the subportion further for any scrolling input ended at a length smaller than d1. In other words, as seen in the sequence of FIGS. 2C-2D-2F, the user may end his scrolling input at a length d1', smaller than the preset scrolling input length d1. The processor will then further scroll the subportion (as if it had momentum) till it is fully displayed in FIG. 2F with the snippets 213 to 215.

In an additional embodiment of the present method, when the subportion size d2 is strictly smaller than the predefined maximum scrolling input length d3, the scrolling may be limited to the subportion, i.e. once the subportion is retrieved, the processor will only scroll that retrieved subportion, i.e. the processor will not display any further elements from the electronic document that immediately follow the subportion. Alternatively, the processor may further display the portion of the electronic document that follows the retrieved subportion in the remained of the panel (of length d3−d2).

FIGS. 4A-4F illustrate the differences between known scrolling techniques and the present fragmented scrolling. FIG. 4A illustrates an electronic document comprising six parts 440 to 445, each part being of equal length d4 in the scrolling direction. Say the touch panel size d3 in the scrolling direction 400 is d3=3×d4. A scrolling input up and down the scrolling direction 400 will cause the processor to reveal different parts of the document, while limiting the display to three max.

In the present method illustrated in FIG. 4B, the subportion length is preset to d2=2×d4. The same electronic document as in FIG. 4A may be parted in three subportions 4401, 4402 and 4403 grouping respectively parts 440 and 441, 442 and 443, 444 and 445. The present method may be associated to a preset scrolling input length d4. Any scrolling input of length equal or smaller then d4 will cause the processor to render the next available subportion, made of two parts. While in the know example of FIG. 4A, the scrolling input would cause the processor to either end the scrolling when the scrolling input is discontinued, or when the momentum from the scrolling input has faded, the processor in the present method of FIG. 4B will interrupt the display to a subportion. The scrolling will appear as fragmented to the user, allowing a better, more intuitive control of the rendering of an electronic document.

The present embodiments were illustrated mostly using reference to touch inputs on a touch interface. The presents teaching may easily be implemented using a pointing device a stylus.

Finally, the above discussion is intended to be merely illustrative of the present system and should not be construed as limiting the appended claims to any particular embodiment or group of embodiments. Thus, while the present system has been described with reference to exemplary embodiments, including user interfaces, it should also be appreciated that numerous modifications and alternative embodiments may be devised by those having ordinary skill in the art without departing from the broader and intended spirit and scope of the present system as set forth in the claims that follow.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for displaying an electronic document comprising a first portion of a page of the electronic document visible on a graphical user interface (GUI) rendered on a touch panel of an electronic device, and a second hidden portion of the page accessible through a scrolling input received on said touch panel, the method comprising:

receiving a scrolling input on the touch panel from a user to access the second hidden portion, retrieving from the second hidden portion a subportion smaller than the touch panel in the scrolling direction, based on the received scrolling input, and scrolling the electronic document to display the subportion in response to the scrolling input, wherein the electronic document is made of contiguous parts of various lengths in the scrolling direction when rendered on the graphical user interface, the retrieving further comprising:

retrieving as many contiguous parts as possible such that the total length of the retrieved contiguous parts in the scrolling direction does not exceed a predefined length, which is smaller than the touch panel length, assembling the retrieved contiguous parts into the subportion, wherein the number of contiguous parts assembled in the subportion varies with their various lengths, wherein the scrolling ceases upon display of the subportion, so as to not display any further part contiguous to the subportion.

2. The method of claim 1, wherein the subportion has a size in the scrolling direction that is predefined.

3. The method of claim 2, comprising a preliminary act of:

marking the subportions in the scrolling direction in the electronic document using the predefined subportion size, the retrieving of a subportion being based on the marking.

4. The method of claim 3, further comprising:
reducing the size of a subportion in the scrolling direction if the subportion extends into a graphical object that would be partially displayed in the graphical user interface.

5. The method of claim 1, wherein the subportion is associated to a first preset scrolling input length in the scrolling direction.

6. The method of claim 5, the scrolling act further comprising:
scrolling the subportion further until it is displayed entirely when the received scrolling input is ended at a scrolling input length smaller than the first preset scrolling input length.

7. The method of claim 5, the scrolling further comprising:
damping or discarding any further scrolling input when the scrolling input length exceeds the first preset length in the scrolling direction so that the scrolling ceases upon display of the subportion, so as to not display any further part contiguous to the subportion.

8. The method of claim 1, the retrieving of a subportion being further based on the speed of the touch input.

9. The method of claim 1, wherein the subportion size is a function of the length of the scrolling input in the scrolling direction.

10. An electronic device for displaying an electronic document comprising a first portion of a page of the electronic document visible on a graphical user interface (GUI) rendered on a touch panel of the electronic device, and a second hidden portion of the page accessible through a scrolling input received on the touch panel, the electronic device comprising a control circuit arranged to:
receive a scrolling input on the touch panel from a user to access the second hidden portion,
retrieve from the second hidden portion a subportion smaller than the touch panel in the scrolling direction, based on the received scrolling input, and
scroll the electronic document to display the subportion in response to the scrolling input,
wherein the electronic document is made of contiguous parts of various lengths in the scrolling direction when rendered on the graphical user interface, the retrieving further comprising:
retrieving as many contiguous parts as possible such that the total length of the retrieved contiguous parts in the scrolling direction does not exceed a predefined length, which is smaller than the touch panel length,
assembling the retrieved contiguous parts into the subportion, wherein the number of contiguous parts assembled in the subportion varies with their various lengths, and
wherein the scrolling ceases upon display of the subportion, so as to not display any further part contiguous to the subportion.

11. A non-transitory computer-readable storage medium comprising a program product stored thereon and executable by a processor in the form of a software agent including at least one software module comprising instructions to implement a method for displaying an electronic document comprising a first portion of a page of the electronic document visible on a graphical user interface (GUI) rendered on a touch panel of an electronic device, and a second hidden portion of the page accessible through a scrolling input received on said touch panel, wherein the instructions comprise:
instructions configured to receive a scrolling input on the touch panel from a user to access the second hidden portion,
instructions configured to retrieve from the second hidden portion of the electronic document a subportion smaller than the touch panel in the scrolling direction, based on the received scrolling input, and
instructions configured to scroll the electronic document to display the subportion in response to the scrolling input,
wherein the electronic document is made of contiguous parts of various lengths in the scrolling direction when rendered on the graphical user interface, the instructions configured to retrieve further comprising:
instructions to retrieve as many contiguous parts as possible such that the total length of the retrieved contiguous parts in the scrolling direction does not exceed a predefined length, which is smaller than the touch panel length, and
instructions to assemble the retrieved contiguous parts into the subportion, wherein the number of contiguous parts assembled in the subportion varies with their various lengths, and
wherein the scrolling ceases upon display of the subportion, so as to not display any further part contiguous to the subportion.

* * * * *